United States Patent
Yang

(10) Patent No.: US 12,349,104 B2
(45) Date of Patent: Jul. 1, 2025

(54) PAGING PROCESSING METHOD AND APPARATUS, USER EQUIPMENT, BASE STATION, AND STORAGE MEDIUM

(71) Applicant: Beijing Xiaomi Mobile Software Co., Ltd., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 511 days.

(21) Appl. No.: 17/995,075

(22) PCT Filed: Apr. 3, 2020

(86) PCT No.: PCT/CN2020/083329
§ 371 (c)(1),
(2) Date: Sep. 29, 2022

(87) PCT Pub. No.: WO2021/196216
PCT Pub. Date: Oct. 7, 2021

(65) Prior Publication Data
US 2023/0180178 A1    Jun. 8, 2023

(51) Int. Cl.
*H04W 68/00* (2009.01)
*H04W 92/18* (2009.01)

(52) U.S. Cl.
CPC .......... *H04W 68/005* (2013.01); *H04W 92/18* (2013.01)

(58) Field of Classification Search
CPC ............... H04W 68/005; H04W 92/18; H04W 76/11; H04W 24/10; H04W 76/27; H04W 76/40; H04W 76/14; H04W 88/04; H04W 68/00
See application file for complete search history.

(56) References Cited

U.S. PATENT DOCUMENTS

| | | | | |
|---|---|---|---|---|
| 2013/0265932 A1* | 10/2013 | Huang | .................. | H04W 76/19 370/312 |
| 2014/0140261 A1* | 5/2014 | Kim | ...................... | H04W 76/40 370/312 |
| 2014/0204847 A1* | 7/2014 | Belleschi | .............. | H04W 76/14 370/329 |

(Continued)

FOREIGN PATENT DOCUMENTS

| CN | 104168629 A | 11/2014 |
|---|---|---|
| CN | 106537813 A | 3/2017 |

(Continued)

OTHER PUBLICATIONS

"R17 Sidelink Relay," Proceedings of the 3GPP TSG RAN Meeting #86, Apple et al., RP-193106 (revision of RP-192717), Dec. 12, 2019, Sitges, Spain, 6 pages.

(Continued)

*Primary Examiner* — Christopher M Brandt
(74) *Attorney, Agent, or Firm* — McCoy Russell LLP

(57) ABSTRACT

A method and apparatus for processing paging, a base station, user equipment, and a storage medium. The method includes: broadcasting a paging message, the paging message carrying a first SL identifier; and receiving a radio resource control (RRC) message returned when first UE determines that the first SL identifier is the SL identifier of the first UE, the RRC message carrying the SL identifier of the first UE.

20 Claims, 11 Drawing Sheets

(56) References Cited

U.S. PATENT DOCUMENTS

| | | | | |
|---|---|---|---|---|
| 2014/0328329 | A1* | 11/2014 | Novlan | H04W 56/0015 370/336 |
| 2016/0135203 | A1 | 5/2016 | Kim et al. | |
| 2017/0013497 | A1 | 1/2017 | Lee et al. | |
| 2017/0055282 | A1* | 2/2017 | Sadiq | H04W 74/08 |
| 2019/0357092 | A1* | 11/2019 | Jung | H04W 36/0077 |
| 2020/0077253 | A1* | 3/2020 | Kim | H04W 76/30 |
| 2020/0260353 | A1* | 8/2020 | Xu | H04W 76/27 |
| 2020/0396734 | A1* | 12/2020 | Li | H04W 56/0005 |

FOREIGN PATENT DOCUMENTS

| | | |
|---|---|---|
| CN | 106576390 A | 4/2017 |
| CN | 109891947 A | 6/2019 |
| CN | 110392431 A | 10/2019 |
| CN | 110662299 A | 1/2020 |
| CN | 110786062 A | 2/2020 |
| CN | 110798297 A | 2/2020 |
| CN | 110891252 A | 3/2020 |
| WO | 2017107011 A1 | 6/2017 |
| WO | 2017171897 A1 | 10/2017 |
| WO | 2020024251 A1 | 2/2020 |

OTHER PUBLICATIONS

"3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 17)," 3GPP TS 36.305 V17.1.0, Jun. 2022, 96 pages.

"Evolved Universal Terrestrial Radio Access (E-UTRA) and Evolved Universal Terrestrial Radio Access Network (E-UTRAN); Overall description; Stage 2 (Release 15)," 3GPP TS 36.300 V15.9.0, Mar. 2020, 365 pages.

* cited by examiner

PAGING PROCESSING METHOD AND APPARATUS, USER EQUIPMENT, BASE STATION, AND STORAGE MEDIUM

CROSS REFERENCE TO RELATED APPLICATION

The present application is a U.S. National Phase of International Application No. PCT/CN2020/083329 entitled "PAGING PROCESSING METHOD AND APPARATUS, USER EQUIPMENT, BASE STATION, AND STORAGE MEDIUM," and filed on Apr. 3, 2020. The entire contents of the above-listed application are hereby incorporated by reference for all purposes.

BACKGROUND

In the related art, paging user equipment (UE) is usually initiated by a network side, a current location of the UE usually needs to be tracked by a mobility management entity, and consequently, paging the UE is technically difficult and causes waste of resources of a base station.

At present, in order to support direct communication between user equipment (UE) and UE, a sideLink (SL) communication mode is introduced. However, in SL communication, an appropriate mode of paging out the corresponding UE is not available.

SUMMARY

Examples of the disclosure disclose an information processing method and apparatus, user equipment, a base station and a storage medium.

According to a first aspect of an example of the disclosure, a method for processing paging is provided and applied to a base station and includes:
broadcasting a paging message, in which the paging message carries a first sideLink (SL) identifier; and
receiving a radio resource control (RRC) message returned when first UE determines that the first SL identifier is an SL identifier of the first UE, in which the RRC message carries the SL identifier of the first UE.

According to a second aspect of an example of the disclosure, a method for processing paging is provided and applied to user equipment (UE) and includes:
receiving a paging message broadcast by a base station, in which the paging message carries a first sideLink (SL) identifier; and
reporting a radio resource control (RRC) message in response to that the first SL identifier carried in the paging message is an SL identifier of current UE, in which the RRC message carries the SL identifier of the current UE.

According to a third aspect of an example of the disclosure, a method for processing paging is provided and applied to second user equipment (UE) and includes:
sending a sideLink (SL) identifier of first UE to a base station, in which the SL identifier is configured to trigger the base station to broadcast a paging message, the paging message carries a first SL identifier, and the first SL identifier is the SL identifier of the first UE; and
the paging message is configured to trigger the first UE to upload an RRC message, and the RRC message carries the SL identifier of the first UE.

According to a fourth aspect of an example of the disclosure, a communication device is provided and includes:
a processor; and
a memory, configured to store an instruction capable of being executed by the processor, in which
the processor is configured to: implement the method for processing paging in any example of the disclosure when running the executable instruction.

According to a fifth aspect of an example of the disclosure, a non-transitory computer storage medium is provided and stores a computer-executable program, in which the executable program, when executed by a processor, implements the method for processing paging in any example of the disclosure.

DETAILED DESCRIPTION

The examples will be described in detail here, and their instances are represented in the accompanying drawings. Unless otherwise indicated, when the following description refers to the drawings, the same number in the different drawings represents the same or similar element. Implementations described in the following examples do not represent all implementations consistent with the examples of the disclosure. Rather, they are merely examples of an apparatus and method consistent with some aspects of the examples of the disclosure as detailed in appended claims.

Terms used in the examples of the disclosure are merely intended to describe specific examples instead of limiting the examples of the disclosure. The singular such as "a/an" and "the" used in the examples of the disclosure and the appended claims also intends to include a plural form unless other meanings are clearly indicated in context. It should be further understood that a term "and/or" used here refers to and contains any one or all possible combinations of one or more associated listed items.

It should be understood that various kinds of information, possibly described by using terms such as first, second and third in the examples of the disclosure, are not supposed to be limited to these terms. These terms are merely used for distinguishing information of the same type. For example, without departing from the scope of the examples of the disclosure, first information may be also called second information, and similarly, the second information may be also called the first information. Depending on the context, a word "if" used here may be constructed as "during . . . ", "when . . . " or "in response to determining".

The disclosure relates to the technical field of wireless communication but is not limited to the technical field of wireless, in particular to a method and apparatus for processing paging, user equipment, a base station, and a storage medium.

Figure 1:
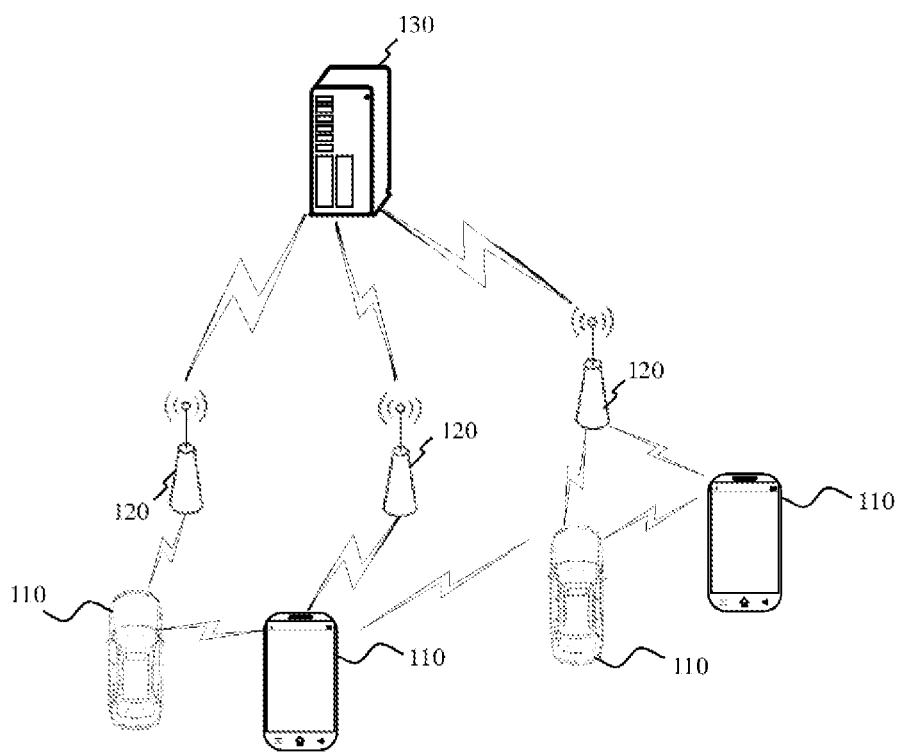
FIG. 1 is a schematic structural diagram of a wireless communication system.

Please refer to FIG. 1, which shows a schematic structural diagram of a wireless communication system provided by an example of the disclosure. As shown in FIG. 1, the wireless communication system is a communication system based on a cellular mobile communication technology and may include: a plurality of user equipment 110 and a plurality of base stations 120.

The user equipment 110 may refer to a device providing a voice and/or data connectivity for a user. The user equipment 110 may communicate with one or more core networks via a radio access network (RAN). The user equipment 110 may be Internet of Things user equipment, such as a sensor device, a mobile phone (or called a "cell" phone) and a computer with the Internet of Things user equipment, for example, the user equipment may be a fixed, portable, pocket, hand-held, computer built-in or on-board apparatus. For example, the user equipment may be a station (STA), a subscriber unit, a subscriber station, a mobile station, a mobile, a remote station, an access point, a remote terminal, an access terminal, a user terminal, a user agent, a user device, or user equipment. Or the user equipment 110 may also be a device of an unmanned aerial vehicle. Or the user equipment 110 may also be an on-board device, for example, may be a trip computer with a wireless communication function, or wireless user equipment externally connected with the trip computer. Or the user equipment 110 may also be a road-side infrastructure, for example, may be a street lamp, signal lamp or other road-side infrastructures with a wireless communication function, or the like.

The base station 120 may be a network side device in a wireless communication system. The wireless communication system may the 4th generation (4G) mobile communication system, also called a long term evolution (LTE) system; or the wireless communication system may also be a 5G system, also called a new radio system or a 5G NR system. Or the wireless communication system may also be a next generation system of the 5G system. An access network in the 5G system may be called a new generation-radio access network (NG-RAN).

Or the base station 120 may be eNB adopted in a 4G system. Or the base station 120 may also be a base station (gNB) adopting a centralized distributed architecture in the 5G system. When adopting the centralized distributed architecture, the base station 120 usually includes a central unit (CU) and at least two distributed units (DU). Protocol stacks of a packet data convergence protocol (PDCP) layer, a radio link control (RLC) protocol layer and a media access control (MAC) layer are arranged in the central unit, a physical (PHY) layer protocol stack is arranged in the distributed units, and the examples of the disclosure do not limit a specific implementation of the base station 120.

A wireless connection may be established between the base station 120 and the user equipment 110 via a wireless radio. In different implementations, the wireless radio is a wireless radio based on a $4^{th}$ generation (4G) mobile communication network technology standard; or the wireless radio is a wireless radio based on a $5^{th}$ generation (5G) mobile communication network technology standard, for example, the wireless radio is a new radio; or the wireless radio may also be a wireless radio based on a next generation mobile communication network technology standard of 5G.

In some examples, an end to end (E2E) connection may also be established between the user equipment 110. For example, there are scenes of vehicle to vehicle (V2V) communication, vehicle to Infrastructure (V2I) communication, vehicle to pedestrian (V2P) communication and the like in vehicle to everything (V2X) communication.

Here, the above user equipment may be regarded as a terminal device in the following examples.

In some examples, the above wireless communication system may also contain a network management device 130.

The plurality of base stations 120 are connected with the network management device 130 respectively. The network management device 130 may be a core network device in the wireless communication system, for example, the network management device 130 may be a mobility management entity (MME) in an evolved packet core (EPC). Or the network management device may also be other core network devices, such as a serving gateway (SGW), a public data network gateway (PGW), a policy and charging rules function (PCRF) unit or a home subscriber server (HSS), etc. The examples of the disclosure do not limit an implementation form of the network management device 130.

Figure 2:
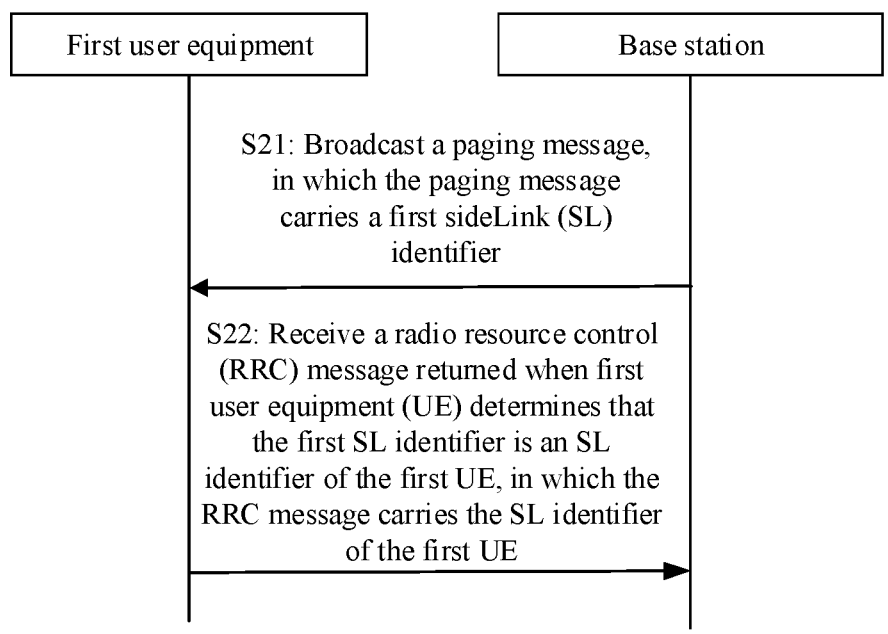
FIG. 2 is a flowchart of a method for processing paging shown according to an example.

As shown in FIG. 2, an example provides description of a method for processing paging. The method for processing paging is applied to a base station and includes:

step S21: a paging message is broadcast, in which the paging message carries a first sideLink (SL) identifier; and step S22: a radio resource control (RRC) message returned when first user equipment (UE) determines that the first SL identifier is an SL identifier of the first UE is received, in which the RRC message carries the SL identifier of the first UE.

Here, the base station may be an access device for user equipment to access a mobile network. The base station may be various base stations, for example, the base station is a 3G base station, a 4G base station or a 5G base station, or the like.

Here, the first UE may be a mobile phone, a computer, a server, a transmitter-receiver, a tablet device, a medical facility or a wearable device, or the like.

In the example of the disclosure, the RRC message is a paging acknowledgement message. Here, the RRC message is used for informing the base station that the first UE is paged out.

In the example of the disclosure, the paging message may include at least one first SL identifier, and the RRC message is sent if the first UE determines that the at least one first SL identifier carried in the paging message is the SL identifier of the first UE after the first UE receives the paging message.

It is worth noting that in the example of the disclosure, the first SL identifier is one type of SL identifiers of UE, and "first" here is merely used for distinguishing different SL identifiers carried in the paging message.

In some examples, the method further includes:
the SL identifier of the first UE sent by second UE is received.

Here, the second UE may also be a mobile phone, a computer, a server, a transmitter-receiver, a tablet device, a medical facility or a wearable device, or the like.

Accordingly, in the example of the disclosure, the SL identifier of the first UE is obtained from the second UE, so that the base station can page out the corresponding first UE based on the SL identifier sent by the second UE.

In an example, the second UE is UE in an RRC-connected state, and the first UE may be UE in any state, for example, may be UE in the RRC-connected state, or UE in an RRC-nonconnected state. The RRC-nonconnected state includes: an RRC-idle state or an RRC-inactive state.

In an example, step S22 includes:
the RRC message returned by the first UE getting into the RRC-connected state based on the paging message is received. If the first UE is in the RRC-nonconnected state when receiving the paging message, the RRC message is returned according to the paging message after the first UE is switched to the RRC-connected state.

In the example of the disclosure, if the first UE is in the RRC-idle state or the RRC-inactive state, the first UE may get into the RRC-connected state by establishing an RRC connection between the first UE and the base station, so that the first UE can send the RRC message based on the RRC connection.

It is worth noting that S21 may include: the paging message carrying the first SL identifier may be broadcast regardless of whether the first UE is in the RRC-connected state or not.

If the first UE is in the connected state, the RRC message can be directly sent through the RRC connection between the first UE and the base station.

In the example of the disclosure, a manner of finding the first UE by the base station is provided, that is, in cases where merely the SL identifier of the first UE is known, the corresponding first UE can be found by broadcasting the paging message by the base station.

In some examples, the paging message further carries a second SL identifier, and
the second SL identifier is configured to identify at least one third UE establishing SL with the first UE.

In an example, the third UE is the second UE of the above example. Certainly, in other examples, the third UE may be any UE except the second UE and the first UE.

In the example of the disclosure, the RRC message received by the base station is sent after the first UE determines that the first SL identifier carried in the paging message is the SL identifier of the first UE and determines that the second SL identifier establishes SL with the at least one third UE.

Accordingly, in the example of the disclosure, in cases where merely the SL identifier of the first UE is known, the corresponding first UE can be determined through the paging message, moreover, whether a link connection is established between the first UE and the third UE corresponding to the second SL identifier may also be determined through the second SL identifier carried in the paging message.

In some examples, the paging message further includes:
transmission type information, configured to indicate a transmission type of SL communication performed between the first UE and the third UE, in which the transmission type is: unicast or multicast.

Accordingly, in the example, the transmission type information carried in the paging message may be used and is configured to indicate a mode of SL communication performed between the first UE and the third UE, such as a communication mode of unicast or multicast connection.

Certainly, in other examples, if the first UE determines that the first SL identifier carried in the paging message is not the SL identifier of the first UE, it is determined that the first UE is not to-be-found UE.

If no first SL identifier is carried in the paging message, whether the first UE is paged UE is determined according to a paging identifier carried in the paging message, and at the moment, the first UE does not need to report the RRC message carrying the SL identifier of the first UE. The paging identifier is different from the SL identifier. The paging identifier includes but is not limited to: a Temporary mobile subscriber identity (TMSI), a serving-temporary mobile subscriber identity (S-TMSI), or an inactivity-radio network temporary identity (I-RNTI) of UE.

In other examples, if the first UE determines that the first SL identifier carried in the paging message is the SL identifier of the first UE and the transmission type information used for indicating SL communication between the first UE and the at least one third UE and carried in the paging message is neither the unicast nor the multicast, it is determined that the first UE is not the paged UE. Accordingly, the first UE does not need to report the RRC message.

It is worth noting that in the example of the disclosure, the first UE may be relay UE of SL communication. For example, the first UE serves as the relay UE for communication between the second UE and the base station, or the first UE serves as the relay UE for communication between the second UE and the third UE.

Figure 3:
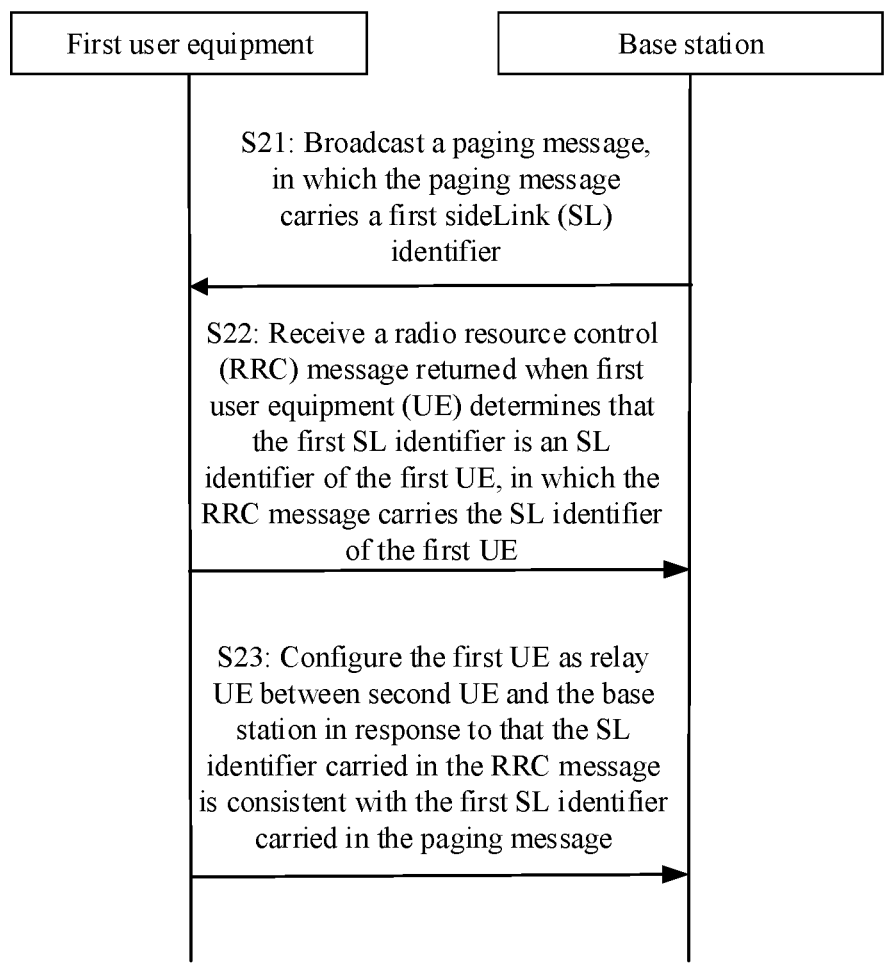
FIG. 3 is a flowchart of a method for processing paging shown according to an example.

As shown in FIG. 3, in some examples, the method further includes:
step S23: the first UE is configured as relay UE between the second UE and the base station in response to that the SL identifier carried in the RRC message is consistent with the first SL identifier carried in the paging message.

Here, the second UE is remote UE, and the first UE is the relay UE.

In the example of the disclosure, the base station may send the paging message through the SL identifier of the first UE reported by the second UE, and the relay UE between the second UE and the base station is determined as the first UE in response to that the SL identifier carried in the RRC message is consistent with the first SL identifier carried in the paging message. Accordingly, in the example of the disclosure, the relay UE between the second UE and the base station can be found based on the first SL identifier sent by the second UE, so that reasonable relay UE can be determined, and better service transmission between the second UE and the base station based on the relay UE, namely the first UE, is facilitated.

Figure 4:
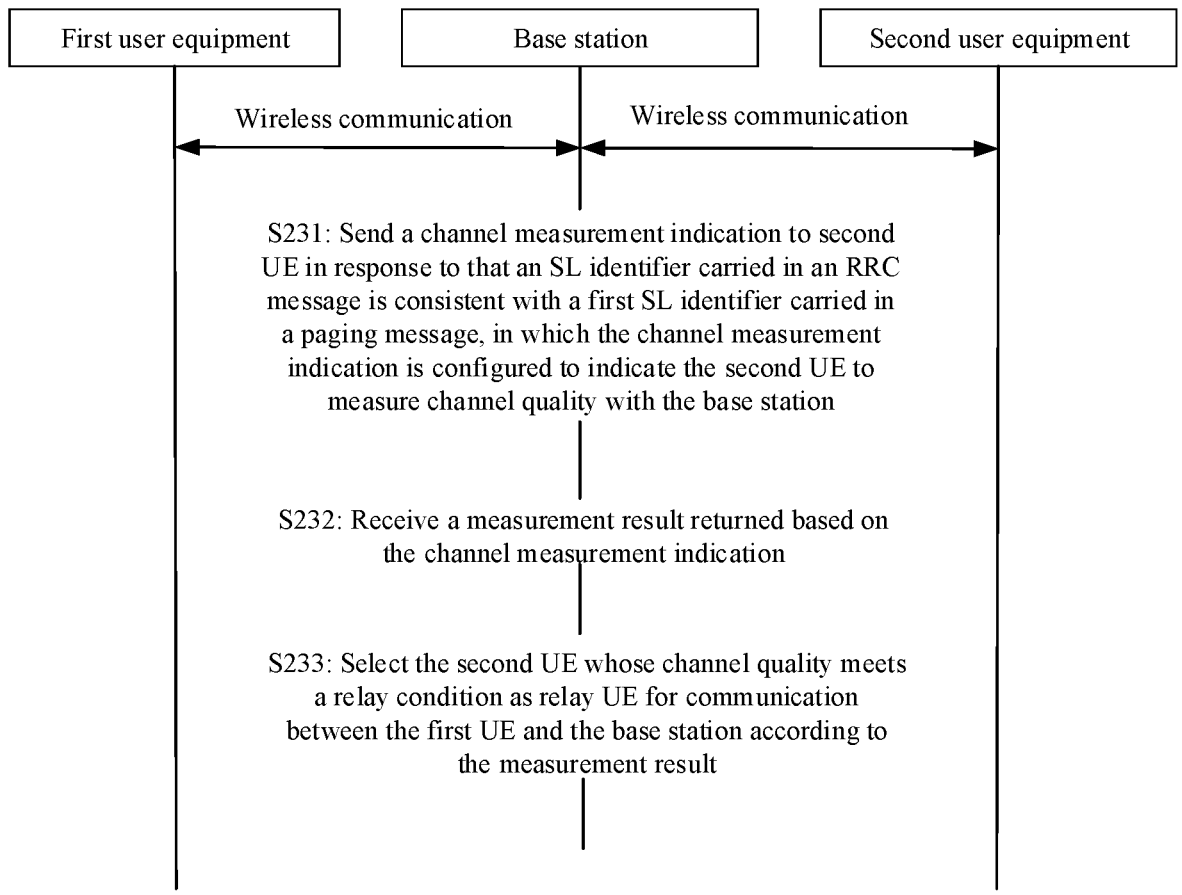
FIG. 4 is a flowchart of a method for processing paging shown according to an example.

As shown in FIG. 4, in some examples, step S24 includes:
step S231: a channel measurement indication is sent to the first UE in response to that the SL identifier carried in the RRC message is consistent with the first SL identifier carried in the paging message, in which the channel measurement indication is configured to indicate the first UE to measure channel quality with the base station;
step S232: a measurement result returned based on the channel measurement indication is received; and
step S233: the first UE whose channel quality meets a relay condition is selected as the relay UE for communication between the second UE and the base station according to the measurement result.

Here, the channel quality includes but is not limited to at least one of the following: a signal to noise ratio, a signal to interference ratio, noise power or a transmission rate.

Here, the channel quality meeting the relay condition includes but is not limited to at least one of the following:
- the signal to noise ratio is greater than or equal to a preset signal to noise ratio threshold;
- the signal to interference ratio is greater than or equal to a preset signal to interference ratio threshold;
- the noise power is smaller than or equal to a preset noise power threshold; or
- the transmission rate is greater than or equal to a preset transmission rate threshold.

In some other examples, step S24 further includes:
- a capability measurement indication is sent to the first UE in response to that the SL identifier carried in the RRC message is consistent with the first SL identifier carried in the paging message, in which the capability measurement indication is configured to indicate terminal capability of the first UE;
- terminal capability information returned based on the capability measurement indication is received; and
- the first UE whose terminal capability meets a relay condition is selected as the relay UE for communication between the second UE and the base station based on the terminal capability information.

Here, the terminal capability includes but is not limited to at least one of the following: a terminal download rate, a terminal upload rate, a CPU memory, an I/O read and write rate, a bandwidth or CPU power consumption.

Here, the terminal capability meeting the relay condition includes at least one of the following:
- the terminal download rate is greater than or equal to a preset download rate;
- the terminal upload rate is greater than or equal to a preset upload rate;
- the CPU memory is greater than or equal to a preset memory;
- the I/O read and write rate is greater than or equal to a preset read and write rate;
- the bandwidth is greater than or equal to a preset bandwidth; or
- the CPU power consumption is greater than or equal to preset power consumption.

In the example of the disclosure, whether the channel quality between the first UE and the base station meets the relay condition may be determined by receiving the measurement result returned by the first UE based on the channel measurement indication, and if yes, it is determined that the first UE is the relay UE between the second UE and the base station. Accordingly, the example of the disclosure can determine the reasonable relay UE through the channel measurement result between the first UE and the base station reported by the first UE, interruption of service transmission caused by unstable network transmission between the relay UE and the base station can be greatly reduced, and stability of service transmission performed between the second UE and the base station based on the relay UE can be improved.

In the example of the disclosure, whether the terminal capability between the first UE and the base station meets the relay condition can also be determined through the terminal capability information returned by the first UE based on the capability measurement indication, and if yes, it is determined that the first UE is the relay UE between the second UE and the base station. Accordingly, the example of the disclosure can determine the reasonable relay UE through the terminal capability of the first UE reported by the first UE, interruption of service transmission caused by the relay UE failing in supporting the needed service transmission can be greatly reduced, and the stability of service transmission performed between the second UE and the base station based on the relay UE can be improved.

Certainly, in other examples, step S24 further includes: a channel measurement indication and a capability measurement indication are sent to the first UE in response to that the SL identifier carried in the RRC message is consistent with the first SL identifier carried in the paging message; the measurement result returned based on the channel measurement indication and the terminal capability information returned based on the capability measurement indication are received; and the first UE whose channel quality meets the relay condition and terminal capability meets the relay condition is selected as the relay UE for communication between the second UE and the base station according to the measurement result and the terminal capability information. Accordingly, in the example, as the terminal capability of the first UE meets the relay condition and the channel quality between the first UE and the base station meets the relay condition, the determined first UE is the more reasonable relay UE, communication between the second UE and the base station based on the first UE can be further facilitated, and communication stability is improved.

In some examples, the method further includes:
- a scheduling instruction is issued, in which the scheduling instruction is configured to indicate scheduling the first UE as the relay UE for communication between the second UE and the base station.

In the example of the disclosure, the base station also sends, to the first UE, the scheduling instruction which indicates scheduling the first UE as the relay UE for communication between the second UE and the base station so as to inform the first UE of being used as the relay UE between the second UE and the base station.

It needs to be pointed out here that the following description of a method for processing paging is applied to user equipment and is similar to description of the above method for processing paging applied to the base station. Technical details not disclosed in the example of the method for processing paging applied to the user equipment in the disclosure please refer to description of the example of the method for processing paging applied to the base station of the disclosure and will not be set forth in detail here.

Figure 5:
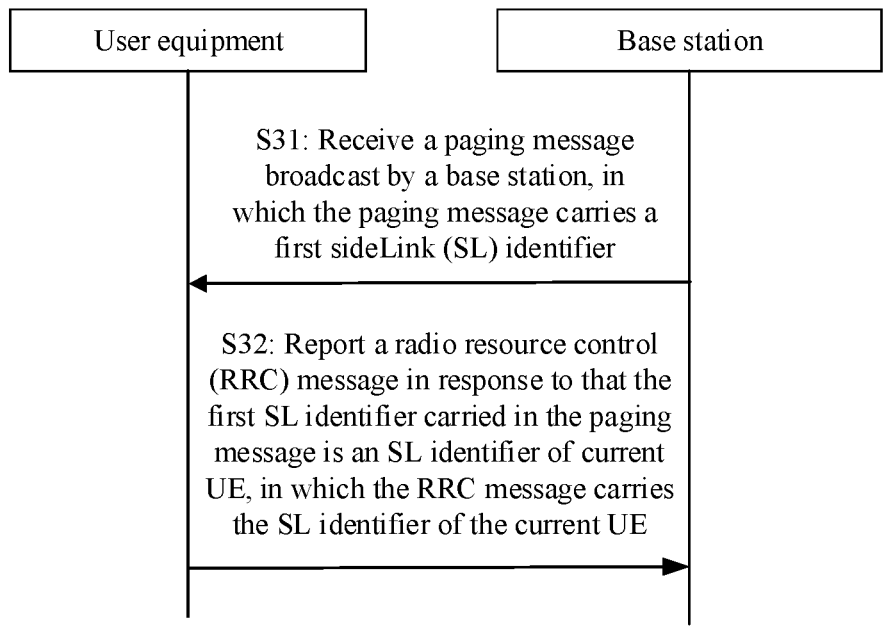
FIG. 5 is a flowchart of a method for processing paging shown according to an example.

As shown in FIG. 5, an example of the disclosure discloses a method for processing paging, applied to user equipment (UE) and including:
- step S31: a paging message broadcast by a base station is received, in which the paging message carries a first sideLink (SL) identifier; and
- step S32: a radio resource control (RRC) message is reported in response to that the first SL identifier carried in the paging message is an SL identifier of current UE, in which the RRC message carries the SL identifier of the current UE.

Here, the UE may be a mobile phone, a computer, a server, a transmitter-receiver, a tablet device, a medical facility or a wearable device, or the like. The UE may be second UE of the above example or first UE of the above example.

In an example, the current UE is the first UE in the above example. In another example, the current UE is the second UE in the above example.

In the example of the disclosure, the UE receives the paging message broadcast by the base station and determines that the first SL identifier carried in the paging message is the SL identifier of the UE, and RRC carrying the SL identifier of the UE is reported. Accordingly, in cases where merely the SL identifier of the first UE is known, the base station can also find the corresponding first UE by the paging message.

In other examples, the method may be: the RRC message is not reported in response to that the first SL identifier carried in the paging message is not the SL identifier of the current UE.

In some examples, reporting the radio resource control (RRC) message in response to that the first SL identifier carried in the paging message is the SL identifier of the current UE includes:
  an RRC-connected state is switched to in response to that the first SL identifier carried in the paging message is the SL identifier of the current UE and the current UE is in an RRC-idle state or an RRC-inactive state; and
  the RRC message is reported after switching to the RRC-connected state.

In the example of the disclosure, if the current UE is in the RRC-idle state or the RRC-inactive state, the current UE may get into the RRC-connected state by establishing an RRC connection between the current UE and the base station, so that the current UE can send the RRC message based on the RRC connection.

In some examples, the paging message further carries a second SL identifier, and
  reporting the radio resource control (RRC) message in response to that the first SL identifier carried in the paging message is the SL identifier of the current UE includes:
  the RRC message is reported in response to that the first SL identifier carried in the paging message is the SL identifier of the current UE and what is indicated by the second SL identifier is third UE establishing SL with the current UE.

In some examples, the paging message contains:
  transmission type information, configured to indicate a transmission type of SL communication performed between the current UE and the third UE, in which the transmission type is: unicast or multicast.

In some other examples, the method includes: the RRC message is not uploaded in response to that the first SL identifier carried in the paging message is the SL identifier of the current UE and the transmission type of SL communication with the third UE is neither unicast nor multicast.

In some examples, the method further includes:
  the current UE is used as relay UE for communication between the second UE and the base station in response to that the first SL identifier carried in the paging message is the SL identifier of the current UE.

Accordingly, in the example of the disclosure, based on the UE needing to be found by the base station as the relay UE between the second UE and the base station, reasonable relay UE can be determined, and better service transmission between the second UE and the base station based on the relay UE is facilitated.

Figure 6:
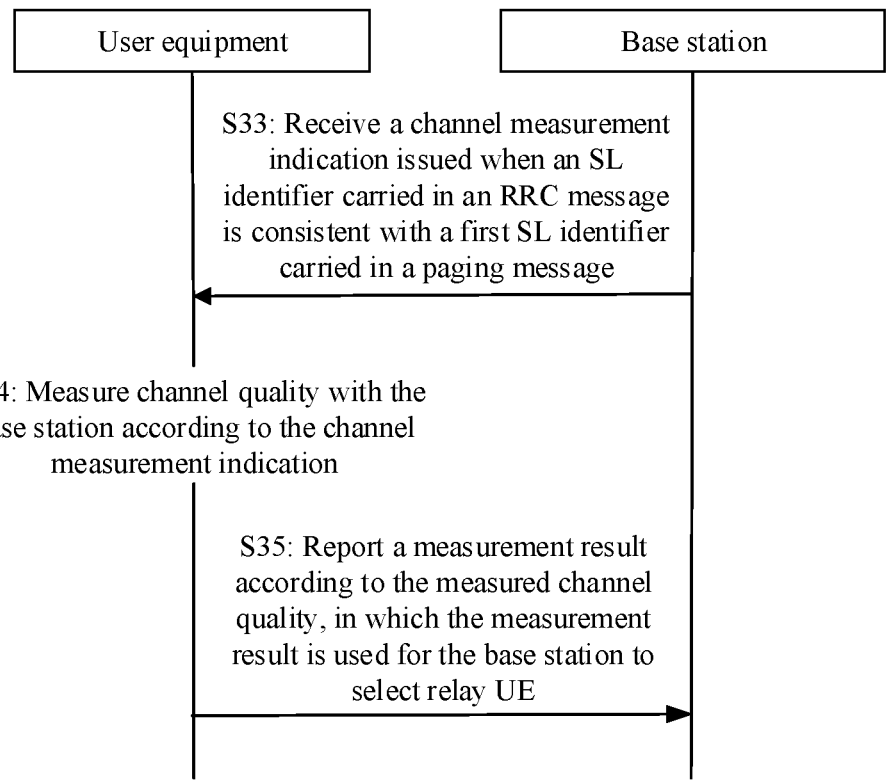
FIG. 6 is a flowchart of a method for processing paging shown according to an example.

As shown in FIG. 6, in some examples, the method further includes:
  step S33, a channel measurement indication issued when the SL identifier carried in the RRC message is consistent with the first SL identifier carried in the paging message is received;
  step S34, channel quality with the base station is measured according to the channel measurement indication; and
  step S35, a measurement result is reported according to the measured channel quality, in which the measurement result is used for the base station to select the relay UE.

Accordingly, in the example of the disclosure, the UE reports the channel quality with the base station, so that the base station can select out the reasonable relay UE based on the channel quality, so interruption of service transmission caused by unstable network transmission between the relay UE and the base station can be greatly reduced, and stability of service transmission between the second UE and the base station based on the relay UE can be improved.

In some other examples, the method further includes:
  a capability measurement indication issued when the SL identifier carried in the RRC message is consistent with the first SL identifier carried in the paging message is received;
  terminal capability of the current UE is measured according to the capability measurement indication; and
  terminal capability information is reported according to the measured terminal capability, in which the terminal capability is used for the base station to select the relay UE.

Accordingly, in the example of the disclosure, the UE reports its own terminal capability, so that the base station can select out the reasonable relay UE based on the terminal capability, so interruption of service transmission caused by the relay UE failing in supporting the needed service transmission can be greatly reduced, and the stability of service transmission performed between the second UE and the base station based on the relay UE can be improved.

Certainly, in other examples, the method may further include:
  the channel measurement indication and the capability measurement indication issued when the SL identifier carried in the RRC message is consistent with the first SL identifier carried in the paging message are received;
  channel quality with the base station is measured according to the channel measurement indication;
  terminal capability of the current UE is measured according to the capability measurement indication;
  a measurement result is reported according to the measured channel quality; and
  terminal capability information is reported according to the measured terminal capability, in which the measurement result and the terminal capability are together used for the base station to select the relay UE.

Accordingly, in the example, the more reasonable relay UE can be determined, communication between the second UE and the base station based on the first UE is further facilitated, and communication stability is improved.

In some examples, the method further includes:
  a scheduling instruction sent by the base station is received, in which the scheduling instruction is configured to indicate scheduling the current UE as the relay UE for communication between the second UE and the base station.

Accordingly, in the example of the disclosure, the UE can be informed that the UE is configured as the relay UE for communication between the second UE and the base station through the received scheduling instruction.

It needs to be pointed out here that the following description of a method for processing paging is applied to second user equipment and is similar to description of the above method for processing paging applied to the base station. Technical details not disclosed in the example of the method for processing paging applied to the second user equipment in the disclosure please refer to description of the example of the method for processing paging applied to the base station of the disclosure and will not be set forth in detail here.

Figure 7:
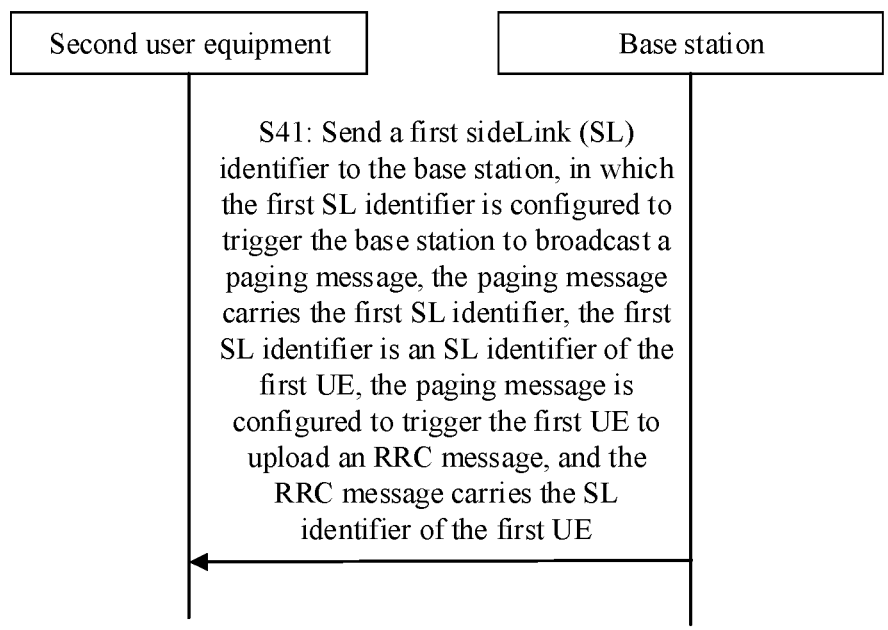
FIG. 7 is a flowchart of a method for processing paging shown according to an example.

As shown in FIG. 7, a method for processing paging is provided and applied to second user equipment (UE) and includes:
- step S41: a first sideLink (SL) identifier is sent to a base station, in which the first SL identifier is configured to trigger the base station to broadcast a paging message, the paging message carries the first SL identifier, and the first SL identifier is the SL identifier of the first UE.

The paging message is configured to trigger the first UE to upload an RRC message, in which the RRC message carries the SL identifier of the first UE.

In some examples, the paging message is further configured to trigger the first UE as relay UE for communication between the second UE and the base station.

In some examples, the method further includes:
- a scheduling instruction sent by the base station is received; and
- the relay UE configured to communicate with the base station is determined according to the scheduling instruction.

For better understanding the above example of the disclosure, description is made by taking the following example.

Example 1

In an application scene, a paging processing system includes first user equipment, second user equipment and a base station; the first user equipment includes: relay UE B and relay UE C, and SL identifiers of the relay UE B and the relay UE C are respectively: 010 and 011; and the second user equipment includes: remote UE A, and an SL identifier of the remote UE A is 001. The relay UE B is in an RRC-connected state, and the relay UE C is in an RRC-idle state.

Figure 8:
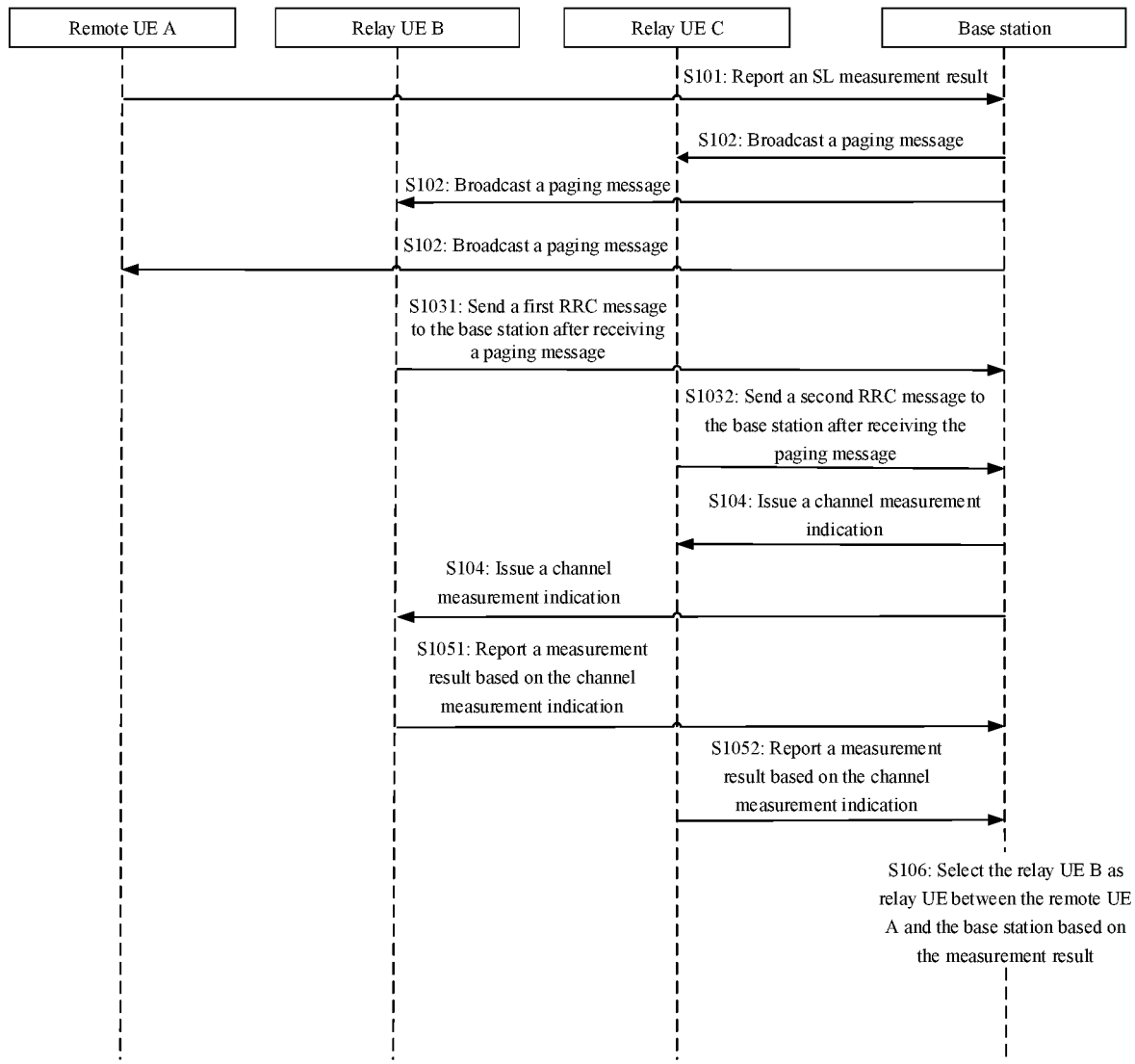
FIG. 8 is a flowchart of a method for processing paging shown according to an example.

As shown in FIG. 8, in an example, a method for processing paging is provided and includes the following steps.

Step S101: an SL measurement result is reported.

In some embodiments, the remote UE A reports the SL measurement result to the base station. The measurement result includes the SL identifiers: 010 and 011, and the measurement result includes noise power: −98 db and −98 db.

Step S102: a paging message is broadcast.

Here, the paging message carries SL identifiers 010 and 011.

In some embodiments, the base station broadcasts the paging message after receiving the SL measurement result sent by the remote UE A. The paging message carries the SL identifiers 010 and 011.

Step S1031: a first RRC message is sent to the base station after the paging message is received.

Here, the first RRC message carries the SL identifier 010.

In some embodiments, the relay UE B determines that the paging message carries the SL identifier 010 which is the same as the SL identifier of the relay UE B after receiving the paging message and sends the first RRC message to the base station. The first RRC message carries the SL identifier 010.

Step S1032: a second RRC message is sent to the base station after receiving the paging message.

Here, the second RRC message carries the SL identifier 011.

In some embodiments, the relay UE C determines that the paging message carries the SL identifier 011 which is the same as the SL identifier of the relay UE C after receiving the paging message and establishes an RRC connection with the base station, and the second RRC message is sent to the base station based on the RRC connection. The second RRC message carries the SL identifier 011 of the relay UE C.

Step S104: a channel measurement indication is issued.

In some embodiments, the base station sends the channel measurement indication to the relay UE B and the relay UE C. The channel measurement indication is configured to indicate measuring channel quality between the relay UE B and the base station and between the relay UE C and the base station respectively.

Step S1051: a measurement result is reported based on the channel measurement indication.

In some embodiments, the relay UE B measures the channel quality between the relay UE B and the base station after receiving the channel measurement indication, and based on the channel quality, the measurement result between the relay UE B and the base station is reported as: noise power consumption −98 db.

Step S1052: a measurement result is reported based on the channel measurement indication.

In some embodiments, the relay UE C measures the channel quality between the relay UE C and the base station after receiving the channel measurement indication, and based on the channel quality, the measurement result between the relay UE C and the base station is reported as: noise power consumption −100 db.

Step S106: the relay UE B is selected as relay UE between the remote UE A and the base station based on the measurement result.

In some embodiments, the base station selects the relay UE B whose noise power is −98 db as the relay UE between the remote UE A and the base station.

Accordingly, in the example, the relay UE can send the RRC message carrying the SL identifier of the relay UE to the base station when determining that the SL identifier carried in the paging message is consistent with the SL identifier of the relay UE, so that the base station can find the corresponding relay UE based on the SL identifier. Which relay UE has a better communication connection with the base station can be determined based on the measurement result between the UE and the base station reported by the relay UE, so that the more suitable relay UE can be selected as the relay UE for communication between the remote UE A and the base station, and thus performance of subsequent service transmission of the remote UE A can be improved.

Example 2

In an application scene, a paging processing system includes first user equipment, second user equipment and a base station; the first user equipment includes: relay UE B, relay UE C and relay UE D, and SL identifiers of the relay UE B, the relay UE C and the relay UE D are respectively: 010, 011, 010; and the second user equipment includes: remote UE A, and an SL identifier of the remote UE A is 001. The relay UE B is in an RRC-connected state, the relay UE C is in an RRC-idle state, and the relay UE D is in the RRC-connected state. The remote UE A establishes a unicast connection with the relay UE B and the relay UE C, but establishes neither the unicast connection nor a multicast connection with the relay UE D.

Figure 9:
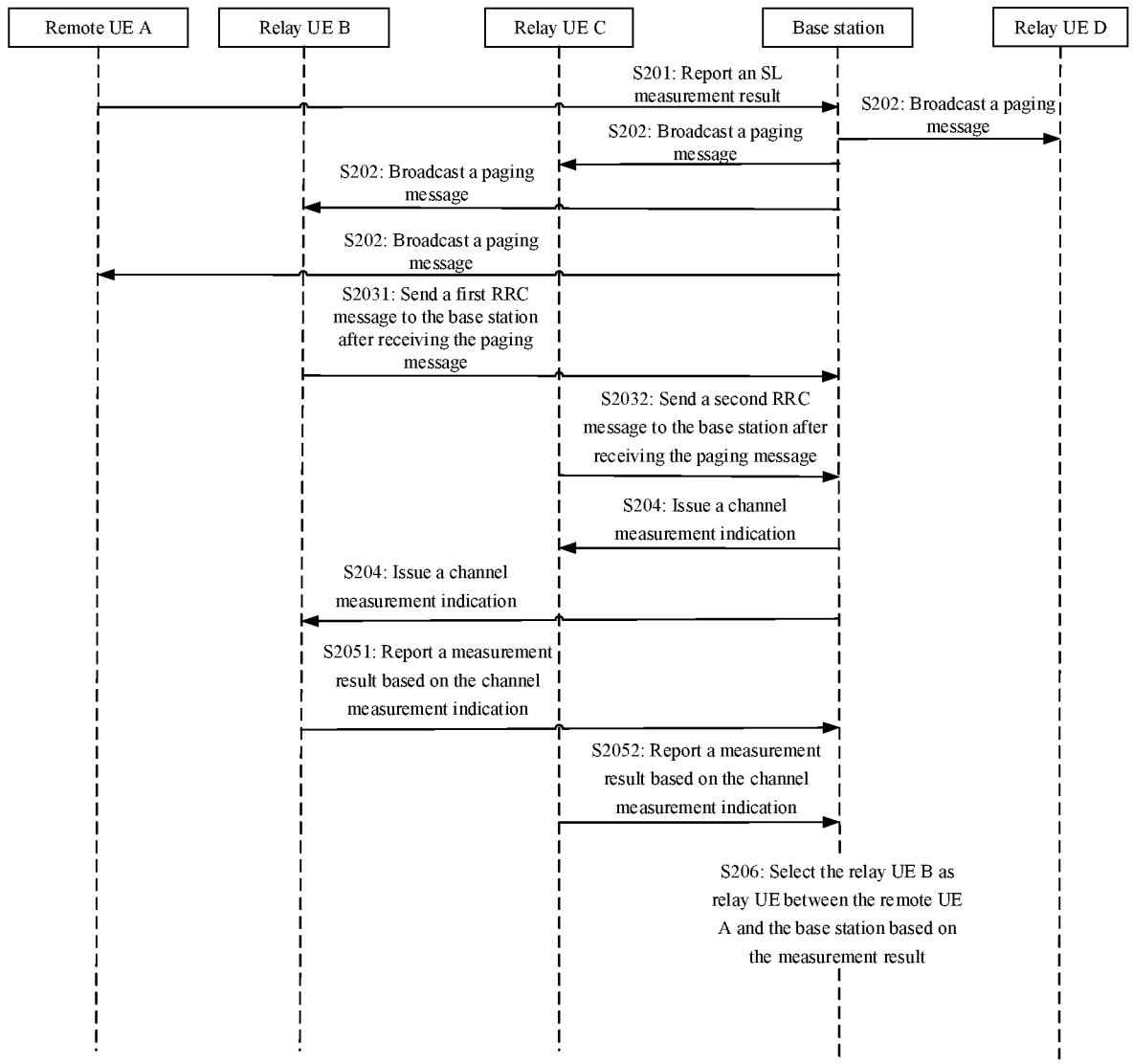
FIG. 9 is a flowchart of a method for processing paging shown according to an example.

As shown in FIG. 9, in an example, a method for processing paging is provided and includes the following steps.

Step S201: an SL measurement result is reported.

In some embodiments, the remote UE A reports the SL measurement result to the base station. The measurement result includes the SL identifiers: 010 and 011, and the measurement result includes noise power: −98 db and −98 db.

Here, the remote UE A establishes the unicast connection only with the relay UE B and the relay UE C, so only the measurement results between the remote UE A and the relay UE B and between the remote UE A and the relay UE C are uploaded.

Step S202: a paging message is broadcast.

Here, the paging message carries first SL identifiers 010 and 011 and carries a second SL identifier 001.

In some embodiments, the base station broadcasts the paging message after receiving the SL measurement result sent by the remote UE A. The paging message carries the first SL identifiers 010 and 011 and carries the second SL identifier 001.

Step S2031: a first RRC message is sent to the base station after receiving the paging message. The first RRC message carries the SL identifier 010.

In some embodiments, the relay UE B determines that the paging message carries the first SL identifier 010 which is the same as the SL identifier of the relay UE B and determines that the unicast connection is established with the UE corresponding to the second SL identifier 001, and send the first RRC message to the base station, after receiving the paging message. The first RRC message carries the SL identifier 010 of the relay UE B.

Step S2032: a second RRC message is sent to the base station after receiving the paging message. The second RRC message carries the SL identifier 011.

In some embodiments, the relay UE C determines that the paging message carries the first SL identifier 011 which is the same as the SL identifier of the relay UE C and determines that the unicast connection is established with the UE corresponding to the second SL identifier 001, and establishes an RRC connection with the base station, and the second RRC message is sent to the base station based on the RRC connection after receiving the paging message. The second RRC message carries the SL identifier 011 of the relay UE C.

Here, the relay UE D does not send the RRC message to the base station after receiving the paging message.

In an optional example, the relay UE D determines that the paging message carries the first SL identifier 010 which is the same as the SL identifier of the relay UE D and determines that no unicast connection is established with the UE corresponding to the second SL identifier 001 after receiving the paging message, so the RRC message is not sent to the base station.

Step S204: a channel measurement indication is issued.

In some embodiments, the base station sends the channel measurement indication to the relay UE B and the relay UE C. The channel measurement indication is configured to indicate measuring channel quality between the relay UE B and the base station and between the relay UE C and the base station respectively.

Step S2051, a measurement result is reported based on the channel measurement indication.

In some embodiments, the relay UE B measures the channel quality between the relay UE B and the base station after receiving the channel measurement indication, and based on the channel quality, the measurement result between the relay UE B and the base station is reported as: noise power consumption −98 db.

Step S2052, a measurement result is reported based on the channel measurement indication.

In some embodiments, the relay UE C measures the channel quality between the relay UE C and the base station after receiving the channel measurement indication, and based on the channel quality, the measurement result between the relay UE C and the base station is reported as: noise power consumption −100 db.

Step S206: the relay UE B is selected as relay UE between the remote UE A and the base station based on the measurement result.

In some embodiments, the base station selects the relay UE B whose noise power is −98 db as the relay UE between the remote UE A and the base station.

Accordingly, in the example, the relay UE can send the RRC message carrying the SL identifier of the relay UE to the base station when determining that the first SL identifier carried in the paging message is consistent with the SL identifier of the relay UE and determining that the UE corresponding to the second SL identifier carried in the paging message establishes the unicast connection with the relay UE, so that the base station can locate the corresponding relay UE based on the first SL identifier, and the found relay UE also establishes the unicast connection with the remote UE. Which relay UE has a better communication connection with the base station can be determined based on the measurement result between the UE and the base station reported by the relay UE, so that the more suitable relay UE can be selected as the relay UE for communication between the remote UE A and the base station, and thus performance of subsequent service transmission of the remote UE A can be improved.

Certainly, in other examples, the relay UE may also send the RRC message carrying the SL identifier of the relay UE to the base station when determining that the first SL identifier carried in the paging message is consistent with the SL identifier of the relay UE and determining that the UE corresponding to the second SL identifier carried in the paging message establishes the multicast connection with the relay UE, so that the base station can locate the corresponding relay UE based on the first SL identifier.

It needs to be pointed out here that the following description of an apparatus for processing paging is similar to description of the above corresponding method for processing paging. Technical details not disclosed in the example of the apparatus for processing paging in the disclosure please refer to description of the example of the above method for processing paging of the disclosure and will not be set forth in detail here.

Figure 10:
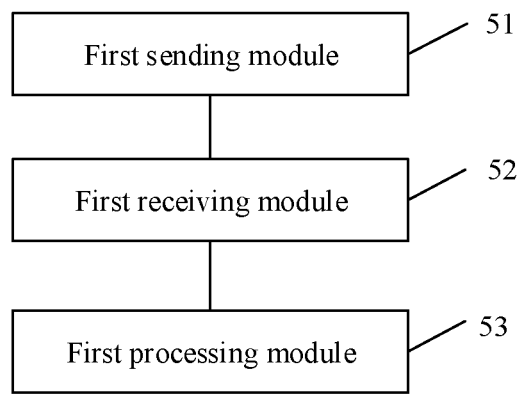
FIG. 10 is a block diagram of an apparatus for processing paging shown according to an example.

As shown in FIG. 10, an example of the disclosure provides an apparatus for processing paging, applied to a base station and including:

a first sending module 51, configured to broadcast a paging message, in which the paging message carries a first sideLink (SL) identifier; and a first receiving module 52, configured to receive a radio resource control (RRC) message returned when first user equipment (UE) determines that the first SL identifier is an SL identifier of the first UE, in which the RRC message carries the SL identifier of the first UE.

In some examples, the first receiving module 52 is configured to receive the SL identifier of the first UE sent by second UE.

In some examples, the paging message further carries a second SL identifier, and the second SL identifier is configured to identify at least one third UE establishing SL with the first UE.

In some examples, the paging message further contains: transmission type information, configured to indicate a transmission type of SL communication performed between the first UE and the third UE, in which the transmission type is: unicast or multicast.

In some examples, the apparatus further includes:
a first processing module 53, configured to configure the first UE as relay UE between the second UE and the base station in response to that the SL identifier carried in the RRC message is consistent with the first SL identifier carried in the paging message.

In some examples, the first sending module 51 is configured to send a channel measurement indication to the first UE in response to that the SL identifier carried in the RRC message is consistent with the first SL identifier carried in the paging message, in which the channel measurement indication is configured to indicate the first UE to measure channel quality with the base station;
the first receiving module 52 is configured to receive a measurement result returned based on the channel measurement indication; and
the first processing module 53 is configured to select the first UE whose channel quality meets a relay condition as the relay UE for communication between the second UE and the base station according to the measurement result.

In some examples, the first sending module 51 is configured to issue a scheduling instruction, in which the scheduling instruction is configured to indicate scheduling the first UE as the relay UE for communication between the second UE and the base station.

Figure 11:
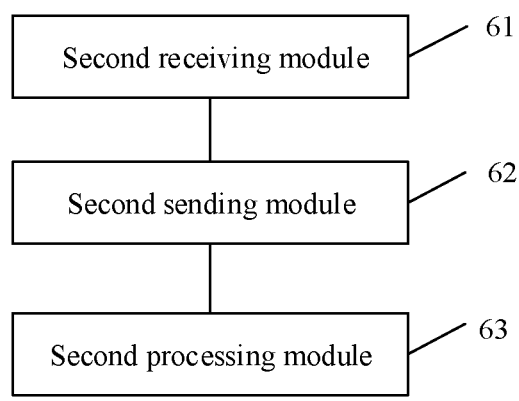
FIG. 11 is a block diagram of an apparatus for processing paging shown according to an example.

As shown in FIG. 11, an example of the disclosure provides an apparatus for processing paging, applied to user equipment (UE) and including:
a second receiving module 61, configured to receive a paging message broadcast by a base station, in which the paging message carries a first sideLink (SL) identifier; and
a second sending module 62, configured to report a radio resource control (RRC) message in response to that the first SL identifier carried in the paging message is an SL identifier of current UE, in which the RRC message carries the SL identifier of the current UE.

In some examples, the second sending module 62 is configured to switch to an RRC-connected state in response to that the first SL identifier carried in the paging message is the SL identifier of the current UE and the current UE is in an RRC-idle state or an RRC-inactive state; and
report the RRC message after switching to the RRC-connected state.

In some examples, the paging message further carries a second SL identifier, and
the second sending module 62 is configured to report the RRC message in response to that the first SL identifier carried in the paging message is the SL identifier of the current UE and what is indicated by the second SL identifier is third UE establishing SL with the current UE.

In some examples, the paging message contains:
transmission type information, configured to indicate a transmission type of SL communication performed between the current UE and third UE, in which the transmission type is: unicast or multicast.

In some examples, the apparatus further includes:
a second processing module 63, configured to use the current UE as relay UE for communication between the second UE and the base station in response to that the first SL identifier carried in the paging message is the SL identifier of the current UE.

In some examples, the second receiving module 61 is configured to receive a channel measurement indication issued when the SL identifier carried in the RRC message is consistent with the first SL identifier carried in the paging message;
the second processing module 63 is configured to measure channel quality with the base station according to the channel measurement indication; and
the second sending module 62 is configured to report a measurement result according to the measured channel quality, in which the measurement result is used for the base station to select the relay UE.

In some examples, the second receiving module 61 is configured to receive a scheduling instruction sent by the base station, in which the scheduling instruction is configured to indicate scheduling the current UE as the relay UE for communication between the second UE and the base station.

Figure 12:
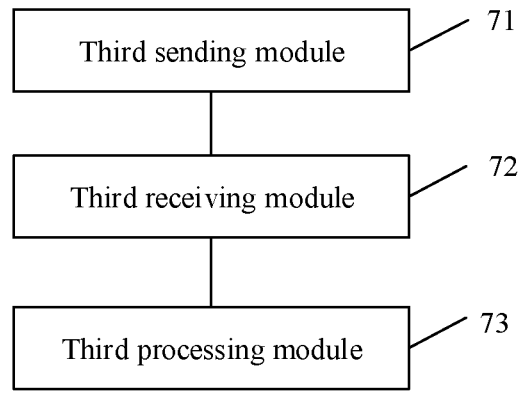
FIG. 12 is a block diagram of an apparatus for processing paging shown according to an example.

As shown in FIG. 12, an example of the disclosure provides an apparatus for processing paging, applied to second user equipment (UE) and including:
a third sending module 71, configured to send a sideLink (SL) identifier of first UE to a base station, in which the SL identifier is configured to trigger the base station to broadcast a paging message, the paging message carries a first SL identifier, and the first SL identifier is the SL identifier of the first UE; and
the paging message is configured to trigger the first UE to upload an RRC message, and the RRC message carries the SL identifier of the first UE.

In some examples, the paging message is further configured to trigger the first UE as relay UE for communication between the second UE and the base station.

In some examples, the apparatus further includes:
a third receiving module 72, configured to receive a scheduling instruction sent by the base station; and
a third processing module 73, configured to determine the relay UE configured to communicate with the base station according to the scheduling instruction.

Specific modes of executing operations of all modules in the apparatus in the above example have been already described in detail in the example of the related method and will not be set forth in detail here.

An example of the disclosure provides a communication device, including:
a processor; and
a memory, configured to store an instruction capable of being executed by the processor, in which
the processor is configured to: implement the method for processing paging in any example of the disclosure when running the executable instruction.

Here, the user equipment includes: a base station or user equipment. Here, the user equipment includes first user equipment or second user equipment in the above example.

The processor may include various storage media, and the storage medium is a non-transitory computer storage medium and can continue memorizing and storing information after the communication device has a power failure. Here, the communication device includes a base station or user equipment.

The processor may be connected with the memory through a bus and the like and is configured to read an executable program stored in the memory, such as at least one of the methods shown in FIG. 2 to FIG. 7.

An example of the disclosure further provides a computer storage medium. The computer storage medium stores a computer executable program, and the executable program, when executed by a processor, implements the method for processing paging in any example of the disclosure, such as at least one of the methods shown in FIG. 2 to FIG. 7.

Specific modes of executing operations of all modules in the apparatus in the above example have been already described in detail in the example of the related method and will not be set forth in detail here.

Figure 13:
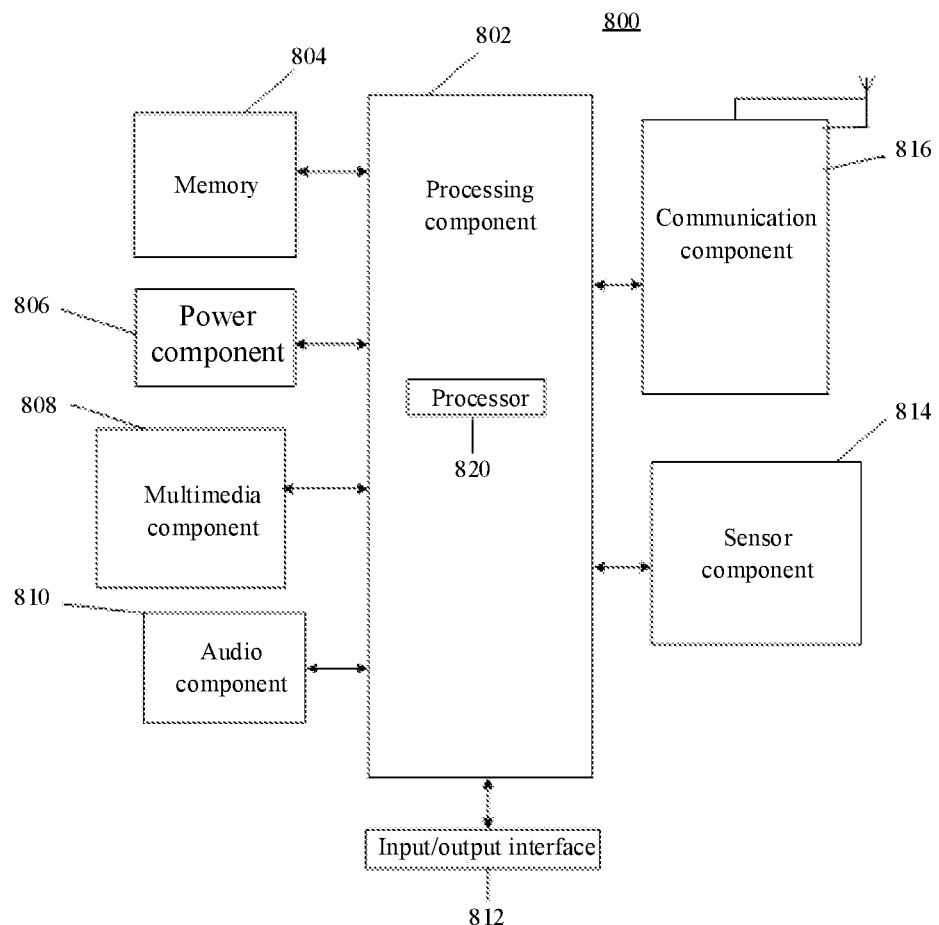
FIG. 13 is a block diagram of user equipment shown according to an example.

FIG. 13 is a block diagram of user equipment (UE) 800 shown according to an example. For example, the user equipment 800 may be a mobile phone, a computer, digital broadcast user equipment, a messaging device, a game console, a tablet device, a medical facility, a fitness facility, a personal digital assistant, or the like.

Referring to FIG. 13, the user equipment 800 may include one or more components as follows: a processing component 802, a memory 804, a power component 806, a multimedia component 808, an audio component 810, an input/output (I/O) interface 812, a sensor component 814 and a communication component 816.

The processing component 802 generally controls whole operations of the user equipment 800, such as operations related to display, phone call, data communication, camera operation and recording operation. The processing component 802 may include one or more processors 820 for executing instructions so as to complete all or part of steps of the above method. Besides, the processing component 802 may include one or more modules to facilitate interaction between the processing component 802 and the other components. For example, the processing component 802 may include a multimedia module so as to facilitate interaction between the multimedia component 808 and the processing component 802.

The memory 804 is configured to store various types of data so as to support operations on the user equipment 800. Examples of these data include instructions of any application program or method operating on the user equipment 800, contact person data, telephone directory data, messages, pictures, videos and the like. The memory 804 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 806 provides power for various components of the user equipment 800. The power component 806 may include a power management system, one or more power sources, and other components related to power generation, management and distribution for the user equipment 800.

The multimedia component 808 includes a screen which provides an output interface between the user equipment 800 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors so as to sense touching, swiping and gestures on the touch panel. The touch sensor can not only sense a boundary of a touching or swiping action, but also detect duration and pressure related to the touching or swiping operation. In some examples, the multimedia component 808 includes a front camera and/or a back camera. When the user equipment 800 is in an operation mode, such as a photographing mode or a video mode, the front camera and/or the back camera can receive external multimedia data. Each front camera and each back camera may be a fixed optical lens system or have a focal length and an optical zoom capability.

The audio component 810 is configured to output and/or input an audio signal. For example, the audio component 810 includes a microphone (MIC). When the user equipment 800 is in the operation mode, such as a call mode, a recording mode and a voice recognition mode, the microphone is configured to receive an external audio signal. The received audio signal may be further stored in the memory 804 or sent via the communication component 816. In some examples, the audio component 810 further includes a speaker for outputting the audio signal.

The I/O interface 812 provides an interface between the processing component 802 and a peripheral interface module, and the above peripheral interface module may be a keyboard, a click wheel, buttons and the like. These buttons may include but are not limited to: a home button, a volume button, a start button and a lock button.

The sensor component 814 includes one or more sensors, configured to provide state evaluation of various aspects for the user equipment 800. For example, the sensor component 814 may detect a start/shut-down state of the equipment 800 and relative positioning of the components, for example, the components are a display and a keypad of the user equipment 800. The sensor component 814 may further detect location change of the user equipment 800 or one component of the user equipment 800, whether there is contact between the user and the user equipment 800, azimuth or speed up/speed down of the user equipment 800 and temperature change of the user equipment 800. The sensor component 814 may include a proximity sensor, configured to detect existence of a nearby object without any physical contact. The sensor component 814 may further include an optical sensor, such as a CMOS or CCD image sensor, for use in imaging application. In some examples, the sensor component 814 may further include an acceleration sensor, a gyroscope sensor, a magnetic sensor, a pressure sensor or a temperature sensor.

The communication component 816 is configured to facilitate wired or wireless communication between the user equipment 800 and other devices. The user equipment 800 may access a wireless network based on a communication standard, such as WiFi, 2G or 3G, or their combinations. In an example, the communication component 816 receives a broadcast signal or related broadcast information from an external broadcast management system via a broadcast channel. In an example, the communication component 816 further includes a near-field communication (NFC) module so as to facilitate short-range communication. For example, the NFC module may be implemented based on a radio frequency identification (RFID) technology, an infra-red data association (IrDA) technology, an ultra wide band (UWB) technology, a Bluetooth (BT) technology and other technologies.

In an example, the user equipment 800 may be implemented by one or more than one application specific integrated circuit (ASIC), digital signal processor (DSP), digital signal processing device (DSPD), programmable logic device (PLD), field-programmable gate array (FPGA), controller, microcontroller, microprocessor or other electronic elements for executing the above method.

In an example, a non-transitory computer-readable storage medium including instructions is further provided, such as a memory 804 including the instructions. The above instructions may be executed by a processor 820 of user equipment 800 so as to complete the above method. For example, the non-transitory computer-readable storage medium may be an ROM, a random access memory (RAM), a CD-ROM, a magnetic tape, a floppy disk, an optical data storage device and the like.

Figure 14:
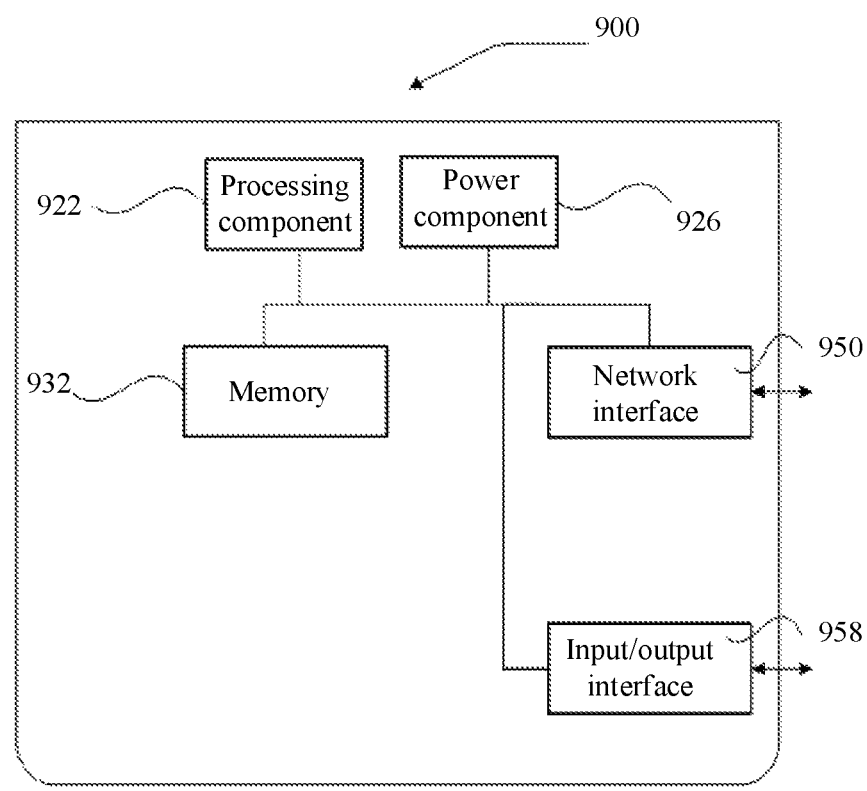
FIG. 14 is a block diagram of a base station shown according to an example.

As shown in FIG. 14, an example of the disclosure shows a structure of a base station. For example, the base station 900 may be provided as a network side device. Referring to FIG. 14, the base station 900 includes a processing component 922, which further includes one or more processors and a memory resource represented by a memory 932, configured to store an instruction capable of being executed by the processing component 922, such as an application program. The application program stored in the memory 932 may include one or more modules each of which corresponds to a set of instructions. Besides, the processing component 922 is configured to execute an instruction so as to execute any method applied to the base station as described above, namely, any aforementioned method, such as the methods shown in FIG. 2 to FIG. 6.

The base station 900 may also include a power component 926 configured to execute power management of the base station 900, a wired or wireless network interface 950 configured to connect the base station 900 to a network, and an input/output (I/O) interface 958. The base station 900 can operate an operating system stored in the memory 932, such as Windows Server™, Mac OS X™, Unix™, Linux™, FreeBSD™, or similar systems.

Those skilled in the art will easily figure out other implementation solutions of the disclosure after considering the specification and practicing the disclosure disclosed here. The disclosure intends to cover any transformation, application or adaptive change of the disclosure which conforms to a general principle of the disclosure and includes common general knowledge or conventional technical means which are not disclosed by the disclosure in the technical field. The specification and the examples are merely regarded as examples, and the true scope and spirit of the disclosure are indicated by the following claims.

It should be understood that the disclosure is not limited to an accurate structure as described above and shown in the drawings, and various modifications and changes can be made without departing from its scope. The scope of the disclosure is limited merely by appended claims.

According to a first aspect of an example of the disclosure, a method for processing paging is provided and applied to a base station and includes:
broadcasting a paging message, in which the paging message carries a first sideLink (SL) identifier; and
receiving a radio resource control (RRC) message returned when first UE determines that the first SL identifier is an SL identifier of the first UE, in which the RRC message carries the SL identifier of the first UE.
In some examples, the method further includes:
receiving the SL identifier of the first UE sent by second UE.

In some examples, the paging message further carries a second SL identifier, and the second SL identifier is configured to identify at least one third UE establishing SL with the first UE.

In some examples, the paging message further contains:
transmission type information, configured to indicate a transmission type of SL communication performed between the first UE and the third UE, in which the transmission type is: unicast or multicast.
In some examples, the method further includes:
configuring the first UE as relay UE for communication between the second UE and the base station in response to that the SL identifier carried in the RRC message is consistent with the first SL identifier carried in the paging message.

In some examples, configuring the first UE as the relay UE for communication between the second UE and the base station in response to that the SL identifier carried in the RRC message is consistent with the first SL identifier carried in the paging message includes:
sending a channel measurement indication to the first UE in response to that the SL identifier carried in the RRC message is consistent with the first SL identifier carried in the paging message, in which the channel measurement indication is configured to indicate the first UE to measure channel quality with the base station;
receiving a measurement result returned based on the channel measurement indication; and
selecting the first UE whose channel quality meets a relay condition as the relay UE for communication between the second UE and the base station according to the measurement result.

In some examples, the method further includes:
issuing a scheduling instruction, in which the scheduling instruction is configured to indicate scheduling the first UE as the relay UE for communication between the second UE and the base station.

According to a second aspect of an example of the disclosure, a method for processing paging is provided and applied to user equipment (UE) and includes:
receiving a paging message broadcast by a base station, in which the paging message carries a first sideLink (SL) identifier; and
reporting a radio resource control (RRC) message in response to that the first SL identifier carried in the paging message is an SL identifier of current UE, in which the RRC message carries the SL identifier of the current UE.

In some examples, reporting a radio resource control (RRC) message in response to that the first SL identifier carried in the paging message is the SL identifier of the current UE includes:
switching to an RRC-connected state in response to that the first SL identifier carried in the paging message is the SL identifier of the current UE and the current UE is in an RRC-idle state or an RRC-inactive state; and
reporting the RRC message after switching to the RRC-connected state.

In some examples, the paging message further carries a second SL identifier; and
reporting the RRC message in response to that the first SL identifier carried in the paging message is the SL identifier of the current UE includes:
reporting the RRC message in response to that the first SL identifier carried in the paging message is the SL identifier of the current UE and what is indicated by the second SL identifier is third UE establishing SL with the current UE.

In some examples, the paging message contains:
transmission type information, configured to indicate a transmission type of SL communication performed between the current UE and the third UE, in which the transmission type is: unicast or multicast.

In some examples, the method further includes:
using the current UE as relay UE for communication between the second UE and the base station in response to that the first SL identifier carried in the paging message is the SL identifier of the current UE.

In some examples, the method further includes:
receiving a channel measurement indication issued when the SL identifier carried in the RRC message is consistent with the first SL identifier carried in the paging message;
measuring channel quality with the base station according to the channel measurement indication; and
reporting a measurement result according to the measured channel quality, in which the measurement result is used for the base station to select the relay UE.

In some examples, the method further includes:
receiving a scheduling instruction sent by the base station, in which the scheduling instruction is configured to indicate scheduling the current UE as the relay UE for communication between the second UE and the base station.

According to a third aspect of an example of the disclosure, a method for processing paging is provided and applied to second user equipment (UE) and includes:
sending a sideLink (SL) identifier of first UE to a base station, in which the SL identifier is configured to trigger the base station to broadcast a paging message, the paging message carries a first SL identifier, and the first SL identifier is the SL identifier of the first UE; and
the paging message is configured to trigger the first UE to upload an RRC message, and the RRC message carries the SL identifier of the first UE.

In some examples, the paging message is further configured to trigger the first UE as relay UE for communication between the second UE and the base station.

In some examples, the method further includes:
receiving a scheduling instruction sent by the base station; and
determining the relay UE configured to communicate with the base station according to the scheduling instruction.

According to a fourth aspect of an example of the disclosure, an apparatus for processing paging is provided and applied to a base station and includes:
a first sending module, configured to broadcast a paging message, in which the paging message carries a first sideLink (SL) identifier; and
a first receiving module, configured to receive a radio resource control (RRC) message returned when first user equipment (UE) determines that the first SL identifier is an SL identifier of the first UE, in which the RRC message carries the SL identifier of the first UE.

In some examples, the first receiving module is configured to receive the SL identifier of the first UE sent by second UE.

In some examples, the paging message further carries a second SL identifier, and the second SL identifier is configured to identify at least one third UE establishing SL with the first UE.

In some examples, the paging message further contains:
transmission type information, configured to indicate a transmission type of SL communication performed between the first UE and the third UE, in which the transmission type is: unicast or multicast.

In some examples, the apparatus further includes:
a first processing module, configured to configure the first UE as relay UE between the second UE and the base station in response to that the SL identifier carried in the RRC message is consistent with the first SL identifier carried in the paging message.

In some examples, the first sending module is configured to send a channel measurement indication to the first UE in response to that the SL identifier carried in the RRC message is consistent with the first SL identifier carried in the paging message, in which the channel measurement indication is configured to indicate the first UE to measure channel quality with the base station;
the first receiving module is configured to receive a measurement result returned based on the channel measurement indication; and
the first processing module is configured to select the first UE whose channel quality meets a relay condition as the relay UE for communication between the second UE and the base station according to the measurement result.

In some examples, the first sending module is configured to issue a scheduling instruction, in which the scheduling instruction is configured to indicate scheduling the first UE as the relay UE for communication between the second UE and the base station.

According to a fifth aspect of an example of the disclosure, an apparatus for processing paging is provided and applied to user equipment (UE) and includes:
a second receiving module, configured to receive a paging message broadcast by a base station, in which the paging message carries a first sideLink (SL) identifier; and
a second sending module, configured to report a radio resource control (RRC) message in response to that the first SL identifier carried in the paging message is an SL identifier of current UE, in which the RRC message carries the SL identifier of the current UE.

In some examples, the second sending module is configured to switch to an RRC-connected state in response to that the first SL identifier carried in the paging message is the SL identifier of the current UE and the current UE is in an RRC-idle state or an RRC-inactive state; and
report the RRC message after switching to the RRC-connected state.

In some examples, the paging message further carries a second SL identifier, and
the second sending module is configured to report the RRC message in response to that the first SL identifier carried in the paging message is the SL identifier of the current UE and what is indicated by the second SL identifier is third UE establishing SL with the current UE.

In some examples, the paging message contains:
transmission type information, configured to indicate a transmission type of SL communication performed between the current UE and third UE, in which the transmission type is: unicast or multicast.

In some examples, the apparatus further includes:
a second processing module, configured to use the current UE as relay UE for communication between the second UE and the base station in response to that the first SL identifier carried in the paging message is the SL identifier of the current UE.

In some examples, the second receiving module is configured to receive a channel measurement indication issued when the SL identifier carried in the RRC message is consistent with the first SL identifier carried in the paging message;

the second processing module is configured to measure channel quality with the base station according to the channel measurement indication; and the second sending module is configured to report a measurement result according to the measured channel quality, in which the measurement result is used for the base station to select the relay UE.

In some examples, the second receiving module is configured to receive a scheduling instruction sent by the base station, in which the scheduling instruction is configured to indicate scheduling the current UE as the relay UE for communication between the second UE and the base station.

According to a sixth aspect of an example of the disclosure, an apparatus for processing paging is provided and applied to second user equipment (UE) and includes:

a third sending module, configured to send a sideLink (SL) identifier of first UE to a base station, in which the SL identifier is configured to trigger the base station to broadcast a paging message, the paging message carries a first SL identifier, and the first SL identifier is the SL identifier of the first UE; and the paging message is configured to trigger the first UE to upload an RRC message, and the RRC message carries the SL identifier of the first UE.

In some examples, the paging message is further configured to trigger the first UE as relay UE for communication between the second UE and the base station.

In some examples, the apparatus further includes:

a third receiving module, configured to receive a scheduling instruction sent by the base station; and a third processing module, configured to determine the relay UE configured to communicate with the base station according to the scheduling instruction.

In the examples of the disclosure, the paging message is broadcast through the base station, in which the paging message carries the first SL identifier; and the radio resource control (RRC) message returned when the first UE determines that the first SL identifier is the SL identifier of the first UE is received, in which the RRC message carries the SL identifier of the first UE. Accordingly, in the examples of the disclosure, a manner of finding the first UE through the base station is provided, that is, in cases where merely the SL identifier of the first UE is known, the corresponding first UE can also be found by broadcasting the paging message by the base station.

The invention claimed is:

1. A method for processing paging, applied to a base station and comprising:
broadcasting a paging message, wherein the paging message carries a first sideLink (SL) identifier; and
receiving a radio resource control (RRC) message returned when first user equipment (UE) determines that the first SL identifier is an SL identifier of the first UE, wherein the RRC message carries the SL identifier of the first UE.

2. The method according to claim 1, further comprising: receiving the SL identifier of the first UE sent by second UE.

3. The method according to claim 1, wherein the paging message further carries a second SL identifier, and the second SL identifier is configured to identify at least one third UE establishing SL with the first UE.

4. The method according to claim 3, wherein the paging message further contains:
transmission type information, configured to indicate a transmission type of SL communication performed between the first UE and the at least one third UE, wherein the transmission type is: unicast or multicast.

5. The method according to claim 1, further comprising:
configuring the first UE as relay UE between second UE and the base station in response to that the SL identifier carried in the RRC message is consistent with the first SL identifier carried in the paging message.

6. The method according to claim 5, wherein configuring the first UE as the relay UE for communication between the second UE and the base station in response to that the SL identifier carried in the RRC message is consistent with the first SL identifier carried in the paging message comprises:
sending a channel measurement indication to the first UE in response to that the SL identifier carried in the RRC message is consistent with the first SL identifier carried in the paging message, wherein the channel measurement indication is configured to indicate the first UE to measure channel quality with the base station;
receiving a measurement result returned based on the channel measurement indication; and
selecting the first UE whose channel quality meets a relay condition as the relay UE for communication between the second UE and the base station according to the measurement result.

7. The method according to claim 1, further comprising:
issuing a scheduling instruction, wherein the scheduling instruction is configured to indicate scheduling the first UE as relay UE for communication between the second UE and the base station.

8. A communication device, comprising:
a processor; and
a memory, configured to store an instruction capable of being executed by the processor, wherein
the processor is configured to implement the method for processing paging according to claim 1 when running the executable instruction.

9. A method for processing paging, applied to user equipment (UE) and comprising:
receiving a paging message broadcast by a base station, wherein the paging message carries a first sideLink (SL) identifier; and
reporting a radio resource control (RRC) message in response to that the first SL identifier carried in the paging message is an SL identifier of current UE, wherein the RRC message carries the SL identifier of the current UE.

10. The method according to claim 9, wherein reporting the radio resource control (RRC) message in response to that the first SL identifier carried in the paging message is the SL identifier of the current UE comprises:
switching to an RRC-connected state in response to that the first SL identifier carried in the paging message is the SL identifier of the current UE and the current UE is in an RRC-idle state or an RRC-inactive state; and
reporting the RRC message after switching to the RRC-connected state.

11. The method according to claim 9, wherein the paging message further carries a second SL identifier, and reporting the radio resource control (RRC) message in response to that the first SL identifier carried in the paging message is the SL identifier of the current UE comprises:
reporting the RRC message in response to that the first SL identifier carried in the paging message is the SL identifier of the current UE and what is indicated by the second SL identifier is third UE establishing SL with the current UE.

12. The method according to claim 11, wherein the paging message contains:
transmission type information, configured to indicate a transmission type of SL communication performed between the current UE and the third UE, wherein the transmission type is: unicast or multicast.

13. The method according to claim 9, further comprising:
using the current UE as relay UE for communication between a second UE and the base station in response to that the first SL identifier carried in the paging message is the SL identifier of the current UE.

14. The method according to claim 13, further comprising:
receiving a channel measurement indication issued when the SL identifier carried in the RRC message is consistent with the first SL identifier carried in the paging message;
measuring channel quality with the base station according to the channel measurement indication; and
reporting a measurement result according to the measured channel quality, wherein the measurement result is used for the base station to select the relay UE.

15. The method according to claim 9, further comprising:
receiving a scheduling instruction sent by the base station, wherein the scheduling instruction is configured to indicate scheduling the current UE as relay UE for communication between second UE and the base station.

16. A communication device, comprising:
a processor; and
a memory, configured to store an executable instruction capable of being executed by the processor, wherein
the processor is configured to implement the method for processing paging according to claim 9 when running the executable instruction.

17. A method for processing paging, applied to second user equipment (UE) and comprising:
sending a first sideLink (SL) identifier to a base station, wherein a first SL identifier is configured to trigger the base station to broadcast a paging message, the paging message carries the first SL identifier, and the first SL identifier is the SL identifier of first UE; and
the paging message is configured to trigger the first UE to upload an RRC message, and the RRC message carries the SL identifier of the first UE.

18. The method according to claim 17, wherein
the paging message is further configured to trigger the first UE as relay UE for communication between the second UE and the base station.

19. The method according to claim 17, further comprising
receiving a scheduling instruction sent by the base station; and
determining relay UE configured to communicate with the base station according to the scheduling instruction.

20. A communication device, comprising:
a processor; and
a memory, configured to store an executable instruction capable of being executed by the processor, wherein
the processor is configured to implement the method for processing paging according to claim 17 when running the executable instruction.

* * * * *